United States Patent [19]

Ikegami

[11] Patent Number: 5,515,607
[45] Date of Patent: May 14, 1996

[54] METHOD OF MANUFACTURING A TIMEPIECE WHEEL

[75] Inventor: Toshimasa Ikegami, Suwa, Japan

[73] Assignee: Seiko Epson Corporation, Tokyo, Japan

[21] Appl. No.: 129,298

[22] Filed: Sep. 28, 1993

Related U.S. Application Data

[62] Division of Ser. No. 708,812, May 31, 1991, abandoned, which is a continuation of Ser. No. 221,682, Jul. 20, 1988, abandoned.

[30] Foreign Application Priority Data

Jul. 21, 1987 [JP] Japan .................................. 62-181341
Sep. 20, 1987 [JP] Japan .................................. 62-150288 U
Dec. 9, 1987 [JP] Japan .................................. 62-187312 U
Apr. 15, 1988 [JP] Japan .................................. 63-94103

[51] Int. Cl.⁶ ........................... B21D 28/00; F16H 55/00; B21K 1/42
[52] U.S. Cl. ........................... 29/893.34; 72/334; 74/432
[58] Field of Search ........................... 29/893.33, 893.34, 29/893.36, 177, 178; 72/330, 334, 337; 74/432

[56] References Cited

U.S. PATENT DOCUMENTS

| | | | |
|---|---|---|---|
| 328,402 | 10/1885 | Hart | 29/178 |
| 364,107 | 5/1887 | Hart | 29/893.34 |
| 4,254,540 | 3/1981 | Bilak | 29/893.36 |
| 4,354,545 | 10/1982 | Goldhammer . | |
| 4,422,995 | 12/1983 | Schad . | |
| 4,496,246 | 1/1985 | Ota et al. . | |
| 4,499,941 | 2/1985 | Goldhammer . | |
| 4,711,584 | 12/1987 | Tanazawa et al. . | |

FOREIGN PATENT DOCUMENTS

164980 12/1981 Japan .

Primary Examiner—P. W. Echols
Attorney, Agent, or Firm—Stroock & Stroock & Lavan

[57] ABSTRACT

A method for manufacturing a timepiece wheel having a bearing portion integrally formed with a pinion and gear wheel. A strip of material is compressed to simultaneously form a thin gear, a pinion and bearing surfaces. The formed gear is then sheared from the remainder of the strip formed of a metal.

11 Claims, 9 Drawing Sheets

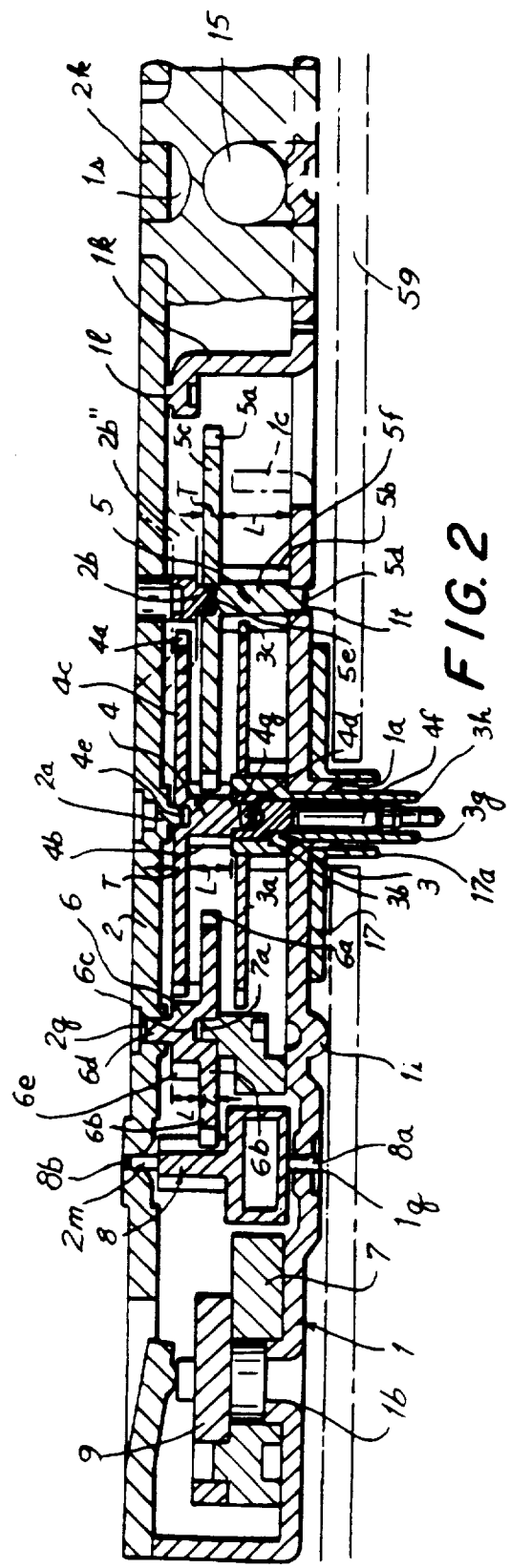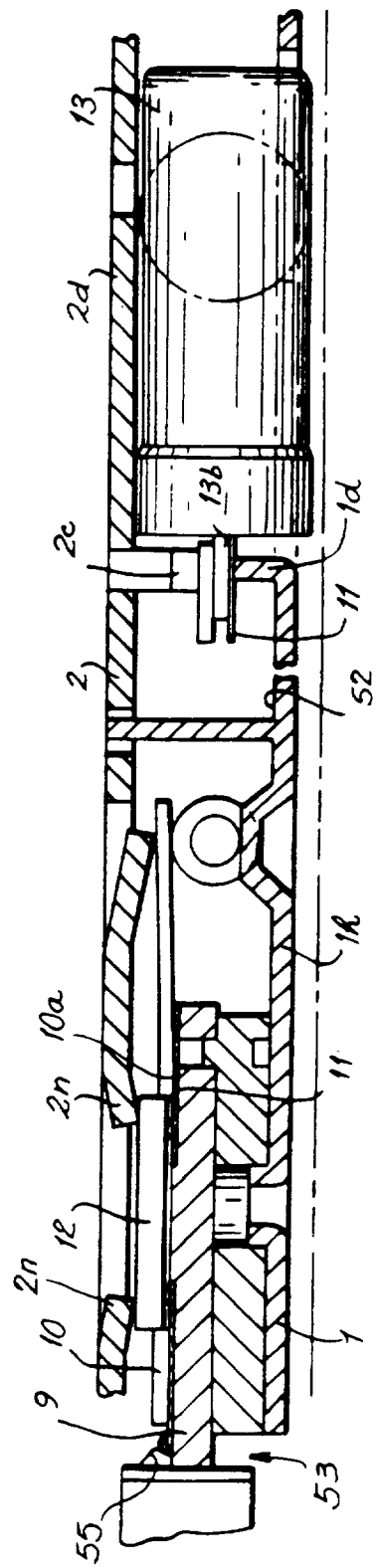

METHOD OF MANUFACTURING A TIMEPIECE WHEEL

This is a division, of application Ser. No. 07/708,812 filed in May 31, 1991, now abandoned, which is a continuation application of Ser. No. 07/221,682 filed Jul. 20, 1988 now abandoned.

BACKGROUND OF THE INVENTION

This invention relates in general to a timepiece wheel, and in particular, to a timepiece wheel having a wheel portion and pinion portion formed by forging or compressing.

Timepiece wheels are known in the art as disclosed in Japanese Laid-open Patent Publication No. 62-161076. This prior art timepiece wheel includes a wheel and pinion formed as separate components. The two components are then joined by an interference fit. A second timepiece wheel is illustrated in Laid-open Patent Publication No. 61-48869 which discloses a timepiece wheel having a pinion portion, gear portion and axis portion integrally formed of a single resin. Another timepiece wheel is known in the art as disclosed by Japanese Laid-open Patent Publication No. 61-55472 which discloses a timepiece wheel having a central hole and a base portion. A tooth portion is integrally formed on the base portion by swelling the base portion.

These prior art mechanisms have been satisfactory, however, the timepiece wheel of Japanese Laid-open Patent Publication No. 62-161076 has a gear portion in which the gear milling is made by press working a doughnut shaped plate. The gear milling of the pinion is formed by a lathing operation which is performed separately from the formation of the gear portion. The pinion is then driven into the gear portion to produce an interference fit. Accordingly, it requires 20 to 30 seconds to produce each gear portion and each pinion. An additional one to two seconds is required to assemble the completed timepiece wheel.

During operation of the timepiece wheel of Japanese Laid-open Patent Publication No. 61-48869, the wheel must be strong enough to bear the slip force of the central wheel and pinion, the force at the time of assembly or detaching the timepiece hands and the pressing force applied by the regular lever. Therefore, the wheel and pinion must be a very strong member which requires enlarging the module of the gear and pinion while increasing the thickness of the plate of the gear. Additionally, more than ten seconds is required to manufacture the timepiece wheel. Accordingly, it becomes relatively expensive to manufacture this prior art timepiece wheel due to the large processing time, expensive materials and necessity to increase the strength of the timepiece wheel by making the timepiece wheel bigger and larger.

The timepiece wheel of Japanese Laid-open Patent Publication No. 61-55472 is formed by opening a hole in the central portion of the wheel and then forming ten independent teeth on the circumference of the wheel by compressing a plate base. This structure has an advantage of requiring less processing time. However, to improve the strength of the die, each tooth is required to be enlarged. Further, the diameter of the hole is larger than the thickness of the wheel base so that when the central hole is open during manufacturing, the gear upon which the teeth should be formed around the hole must become very large. Such a gear is not suitable for the acceleration or deceleration which is required in the gear train of the timepiece. In particular, when the timepiece wheel is positioned in the front gear train, the acceleration gear train, or the deceleration gear train, because the central hole is very large, and because the front gear train always includes the broken portions formed by shearing, the torque loss at the bearing portion is large. Additionally, each tooth is formed independently so that the height of each tooth will vary during manufacturing. This variation of tooth height makes the positioning of the gear difficult at the top surface of the teeth.

Accordingly, it is desirable to provide a timepiece wheel which overcomes the shortcomings of the prior art device described above.

SUMMARY OF THE INVENTION

Generally speaking, in accordance with the invention, a timepiece wheel having a pinion portion, gear portion and bearing portion integrally formed of the same metal material providing a desirable strength is provided. The bearing portion is manufactured by plastic working, providing a smooth finished surface.

The timepiece wheel is formed from a sheet of material. The material is compressed to form the bearing portion and pinion portion. An ejector ejects the processed time wheel which has remained in the dye. The ejector is provided with the outer diameter of the tooth of the pinion portion.

It is an object of this invention to provide an improved timepiece wheel and method of manufacturing same.

Another object of this invention is to provide a timepiece wheel wherein the pinion portion, gear portion and bearing portion are integrally formed of the same metal material to provide a desirable material strength.

Still another object of this invention is to provide a timepiece wheel in which the bearing portion is manufactured to obtain a smooth finished surface, reducing the torque loss.

Yet another object of the invention is to provide a timepiece wheel in which each tooth profile is formed unitarily.

Yet another object of the invention is to provide a timepiece wheel having a pinion height great enough to engage with other gears in a deceleration gear train or acceleration gear train.

Still a further object of the invention is to provide a method of manufacturing a timepiece wheel at a reduced cost.

Still other objects and advantages of the invention will in part be obvious and will in part be apparent from the specification and drawings.

The invention accordingly comprises features and constructions, combinations of elements, arrangements of parts and steps of manufacture which will be exemplified in the constructions hereinafter set forth and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 2, 3, 4a, 4b and 5 are fragmented cross-sectional developed views through different portions of FIG. 1;

DESCRIPTION OF THE PREFERRED EMBODIMENTS

Figure 1:
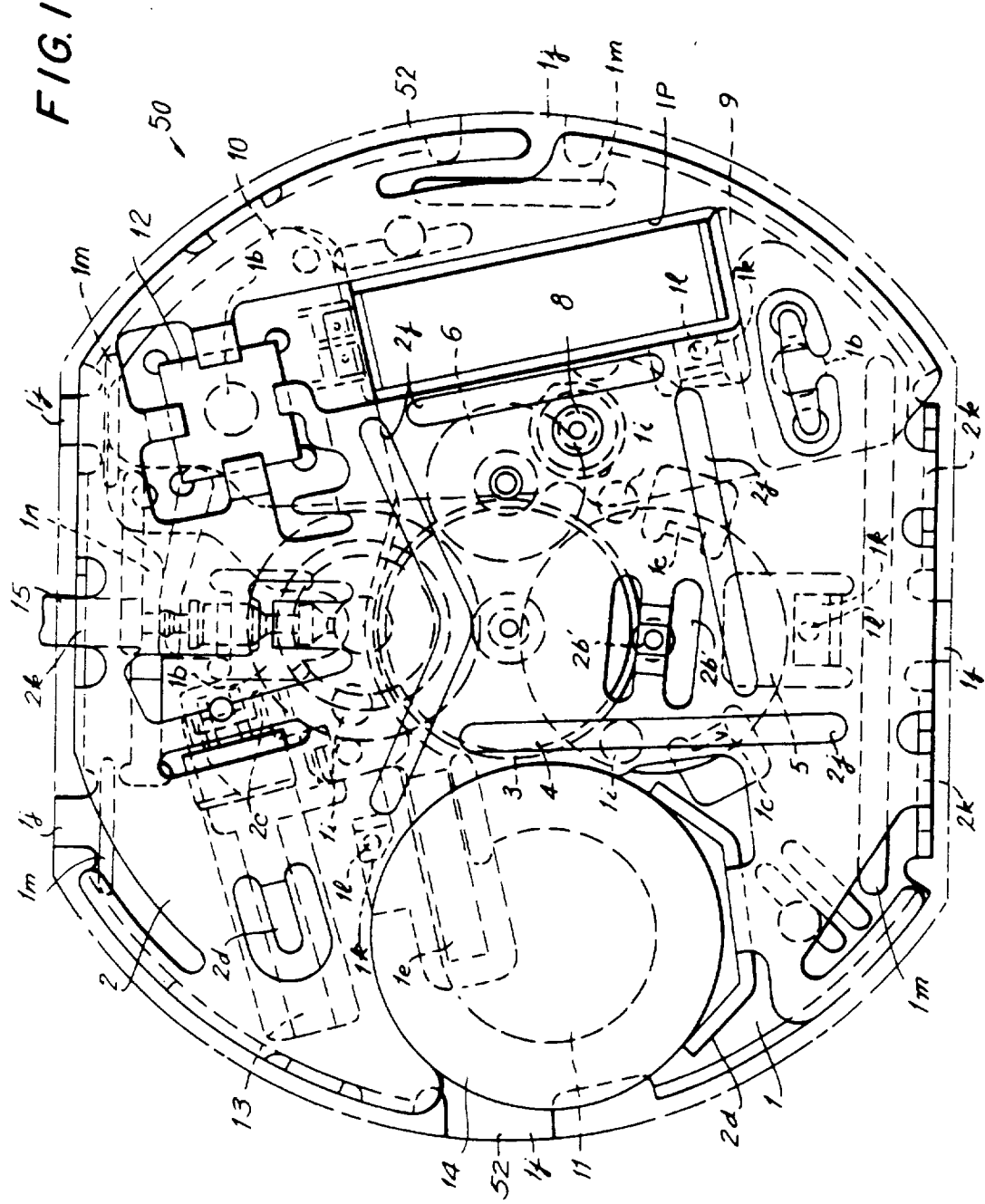
FIG. 1 is a top plan view of a timepiece constructed in accordance with one embodiment of the invention.

Reference is first made FIG. 1–5 in which a timepiece, generally indicated as 50 having timepiece wheels constructed in accordance with the invention is shown.

Timepiece 50 includes a main plate 1 and a gear train bridge 2 connected to a front surface 52 of main plate 1. Main plate 1 is provided with a bushing 1a and gear train bridge 2 which includes a dowel 2a projecting towards plate 1. A center gear and pinion, generally indicated as 3, is rotatably supported in bushing 1a. Center gear and pinion 3 includes a center gear wheel 3a having teeth 3c and a pinion 3b. Pinion 3b extends through bushing 1a and includes a hollow shaft 3h having a distal end 3g. A fourth gear and pinion generally indicated as 4, having a shaft 4d extends within center gear and pinion 3 so as to be supported within gear and pinion 3. Fourth gear and pinion 4 is supported at its upper end by dowel 2a of the gear train 2 so as to be rotatably supported between dowel 2a and bushing 1a through center wheel and pinion assembly 3.

Fourth wheel and pinion 4 includes a pinion portion 4b, a gear wheel (collar) 4c extending from pinion portion 4b, a shaft 4d extending from collar 4c and a concave portion 4e. Gear teeth 4a are formed about collar 4c to form the wheel. An axis 4f is affixed to the wheel by an interference fit between a cavity 4g formed in axis 4f and shaft 4d. Dowel 2a of gear train bridge 2 protrudes into a concave portion 4e of fourth wheel and pinion 4, rotatably supporting wheel 4 and serving as an upper pivot. By this construction, center wheel and pinion 3 and fourth wheel and pinion 4 are piled one upon the other and mutually support each other for rotation between frame 1 and gear train bridge 2.

The amount of play (i.e. looseness of fit) of both fourth wheel and pinion 4 and center wheel and pinion 3 in their axial directions is determined by the formation of the upper surface of main plate 1 and the half-blanking portion; that portion formed by press working in a half-shearing process to form the projection 2a of gear train bridge 2.

Pinion 4b, gear wheel 4c, inner shaft 4d and concave portion of gear mechanism 4 are formed by forging (with or without heating) and teeth 4a are formed by shearing or blanking.

A third wheel and pinion assembly, generally indicated as 5, includes a pinion 5b. Pinion 5b is formed by forging or compressing. A shaft ending in a lower pivot defined by a distal end 5d of lesser diameter extends from pinion 5b. A third wheel 5c is formed above pinion 5b and includes a concave portion 5e formed therein to act as an upper pivot. Gear teeth 5a are formed about wheel 5c and engage pinion 4b. Gear teeth 5a are formed by blanking a tooth profile. Lower pivot 5d is supported in an opening 1t of main plate 1 while concave portion 5e receives a dowel 2b formed in a support 2b' bridging holes 2b'' formed on gear train bridge 2 to act as the upper pivot. Dowel 2b is formed by drawing, plastic (i.e. press) working and/or half-blanking. Main plate 1 is provided with a bending portion 1c protruding above top surface 52 for preventing third wheel and pinion assembly 5 from inclining during assembly.

A stator 7 is supported on main plate 1. A fifth wheel and pinion, generally indicated as 6, is supported in timepiece 50 and has a structure similar to third wheel and pinion assembly 5 having a pinion 6e, a wheel 6b and gear teeth 6a. However, concave portion 6e acts as the lower pivot while a shaft 6d acts as the upper pivot. Shaft 6d is supported within a blind hole 2q provided in the half-blanked portion of gear train bridge 2 and concave portion 6c is supported on a protrusion 7a formed in stator 7 to act as the lower pivot.

Pinion 6e of fifth wheel and pinion assembly 6 is formed by forging and compressing and has a pinion height L greater than 0.4 mm. To satisfy this condition the number of pinion teeth should be less than eight. Wheel and pinion assembly 6 is desirably made of a copper alloy especially those of brass or aluminum. The ratio of the wheel thickness T with respect to the pinion height L, T/L of each pinion for wheel and pinions 4, 5 and 6 is desirably less than one half to provide a thin movement. Further the wheel thickness T should be less than 0.25 mm so that the press blanking of the teeth profiles may be performed with a relatively small module.

The portion of gear train bridge 2 supporting fourth wheel and pinion 4 and fifth wheel and pinion 6 is formed by half-blanking to reduce the contact resistance between gear train bridge 2 and the wheel and pinions. Consequently, wheel and pinions 4 and 6 are able to more freely rotate and do not require the use of jewels (i.e. stones). Another purpose of the half-blanking which locates and guides upper pivot 6d of fifth wheel pinion 6 is to provide an oil reservoir for timepiece 50.

A rotor 8 having a lower pivot 8a supported within a hole 1q in the half-blank portion in a manner similar to that of the above described wheels. An upper pivot 8b of rotor 8 is supported within a hole 2m formed on a sloping portion of a half-blanked portion of gear train bridge 2. Rotor 8 is made of plastic. Stator 7 is positioned in the horizontal direction by two bushings 1b formed in main plate 1.

As shown in FIG. 3, a coil block 53 includes a magnetic core 9, a coil lead 55, a coil lead substrate 10 acting as a terminal of coil lead 55 and an insulating plate 11 on which coil lead 55 is mounted. Coil lead substrate 10 forms a wiring pattern at the side of magnetic core 9. The external periphery of an integrated circuit (IC) chip 12 is guided into position on coil lead substrate 10 by an opening 10a within coil lead substrate 10. Lead substrate 10 forms a pattern within opening 10a corresponding to the terminals of IC chip 12 to contact the corresponding terminals of IC chip 12. The terminals of IC chip 12 are defined by bumps made for example, of gold (Au). A showing of these bumps and an embodiment of the mounting of a chip in the timepiece in accordance with the invention is found in U.S. patent application Ser. No. 07/164,299, now U.S. Pat. No. 5,008,868 and the disclosure of that application is incorporated herein as if fully set forth. IC chip 12 is introduced into opening 10a at coil lead substrate 10 during assembly. IC chip 12 is then pressed into position by IC chip spring 2n of gear train bridge 2. The spring force connects IC chip 12 and the portion of the pattern formed on substrate 10 which projects within opening 10a. Further, the spring force also magnetically connects stator 7 and magnetic core 9.

A crystal oscillating unit 13 is horizontally positioned within an opening 1p of main plate 1. Crystal terminals 13b extend from crystal 13. A pair of springs 2c which are integrally connected to gear train bridge 2 press against coil lead substrate 10. The wiring pattern (not shown) of coil lead substrate 10 in the vicinity of crystal oscillating unit 13 faces main plate 1. The pressure exerted at springs 2c against coil lead substrate 10 biases the wiring pattern against terminals 13b of crystal oscillating unit 13 resulting in a solid electrical connection therebetween. A bent portion 1d of main plate 1 positions insulating plate 11 against terminal 13b. Additionally, crystal unit 13 is maintained in place by a crystal press spring 2d formed on gear train bridge 2.

A battery 14 is supported on main plate 1. As shown FIGS. 1 and 5, a spring 1e integrally connected to main plate 1 presses against insulating plate 11 which in turn presses against an electric conductor such as a piece of copper 10a. Piece 10a is disposed between an edge of coil lead substrate 10 and a negative terminal (cathode) of 14a of battery 14. The cathode of battery 14 is connected to copper pattern 10b by the spring force applied by minus terminal 1e. Furthermore, connection to the plus terminal is provided by springs 2d formed integrally with gear train bridge 2. Gear train bridge 2 is made from an electrically conductive material. Therefore, an electrical path from positive terminal 14b of battery 14 to a VDD terminal of IC chip 12 is established.

Extending from main plate 1 towards gear train bridge 2 are flexure portions 1f and 1g for guiding and positioning a winding stem 15 in the region between main plate and gear train bridge 2. Winding stem 15 is positioned in a vertical direction between plate 1 and bridge 2 and is guided for displacement parallel to top surface 52 of main plate 1 (i.e. the horizontal direction). Winding stem 15 is also guided by a projection 1y which protrudes above top surface 52 of main plate 1. Flexure portions 1f and 1g are formed by drawing and half-blanking each with E-shape opening 68, one of which is shown in FIG. 2. Winding stem 15 is biased in the direction of main plate 1 by a spring 2r formed in gear train bridge 2, which bears on a portion of coil lead substrate 10 which in turn bears on winding stem 15. By providing flexure portions 1f and 1g and projection 1y, any deformation normally occurring in a guide hole during bending of flexure portions 1f and 1g and any inaccuracy in the diameter of the guide hole does not adversely affect movement of winding stem 15 in the direction denoted by arrows A and B.

Winding stem 15 includes a two part stepping portion 15a and a pinion 15b. A click spring 1h is positioned on top surface 52 of main plate 1 to contact and bias stepping portion 15a. An end portion (not shown) of click spring 1h is bent. Removal of winding stem 15 is accomplished by pressing down against this end portion of click spring 1h using an appropriate instrument. Once the end portion of click spring 1h is pressed down by the instrument, click spring 1h is no longer in contact with stepping portion 15a allowing winding stem 15 to be easily removed from timepiece 50.

In normal operation, when winding stem 15 is pulled out slightly (i.e. one step) in the direction of arrow A, click spring 1h presses against a central sloped portion 84 of stepping portion 15a and is cammed over the sloped portion 84 into the other part of stepping portion 15a. Pinion 15b now engages a plurality of teeth 16c of a minute wheel 16. By rotating winding stem 15, teeth 16a of minute wheel 16 meshingly rotates with pinion 3b of center wheel and pinion 3 resulting in the desired repositioning of a minute hand (not shown) which is attached to distal end 3g of shaft 3h.

Click spring 1h is cut so that a portion thereof defines almost no gap with top surface 52 of main plate 1 in the vertical direction. Such a cut is commonly referred to as "zero cut". By zero cutting a portion of click spring 1h, winding stem 15 is prevented from being pulled out too far from case 58. In particular, by providing a zero cut of click spring 1h so that substantially no gap exists between a portion of click spring 1h and main plate 1, the force (i.e. thrust) exerted on winding stem 15 when pulled outwardly away from casing 58 in the direction of arrow A is substantially transmitted to the zero cut portion of click spring 1h. Accordingly, the portion of click spring 1h in contact with stepping portion 15a is not distorted in the direction of the thrust.

Minute wheel 16 includes a plurality of teeth 16a which mesh with pinion 3b of gear 3 in a pinion 16b which meshes with an hour wheel 17. A plurality of teeth 16c of minute wheel 16 extending towards gear train bridge 2 are operable for meshing with pinion 15b when winding stem 15 is pushed outwardly from case 58 as described above. Accordingly, when pinion 15b meshes with teeth 16c, teeth 16b meshingly rotate hour wheel 17 so that an hour hand (not shown) which is attached to a shaft 17a of minute wheel 17 is repositioned as desired.

Figure 7A:
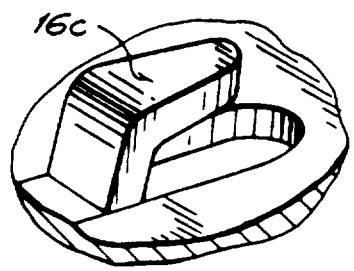
FIG. 7a is a perspective view of a tooth from a first set of teeth of a minute wheel.
Figure 7B:
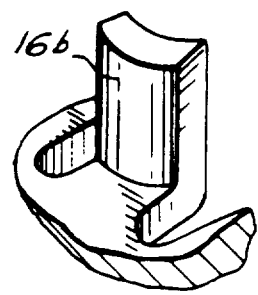
FIG. 7b is a perspective view of a tooth from a second set of teeth of the minute wheel.

As shown in FIG. 7b, each of a plurality of teeth 16b (shown upside down as compared to the position in FIG. 4) is made by cutting a partial ring in minute wheel 16 and then bending the cut portion of minute wheel 16 within the partial ring at a substantially 90° angle. As shown in FIG. 7a the plurality of teeth 16c (only one of which is shown) are made by shearing the plane of minute wheel 16 and then bending each of the plurality of teeth 16c at a first right angle and the distal end thereof at a second right angle. Teeth 16a are made by shearing the edge of minute wheel 16.

Figure 4B:
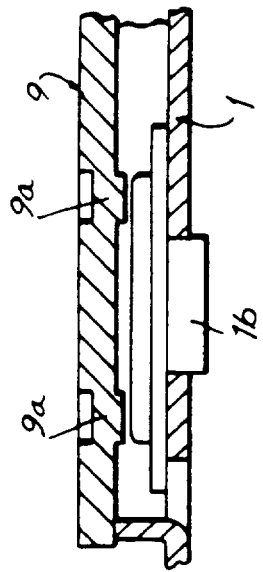
Figure 4A:
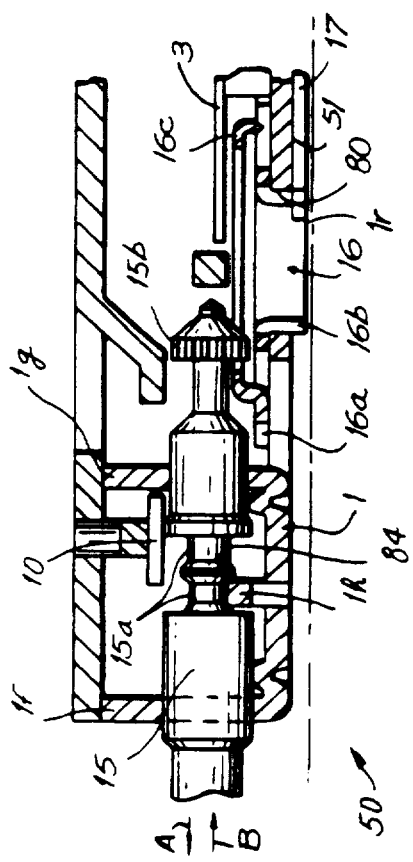

Referring to FIGS. 4a and 4b, the plurality of teeth 16b form the equivalent of a pinion, the root of which is supported by top surface 52 of main plate 1. Teeth 16b extend from an opening 80 of main plate 1. The degree of freedom of movement in the axial direction of minute wheel 16 is determined by protrusions 9a which extend from magnetic core 9 and are formed by half-blanking.

Hour wheel 17 is located on a rear surface 51 of main plate 1. As shown in FIG. 2, a protrusion 1i extending from rear side of main plate 1 provides a sufficient gap between main plate 1 and a dial face 59 of timepiece 50 to allow hour wheel 17 to freely rotate. Projection 1i is made by drawing or half-blanking.

Figure 5:
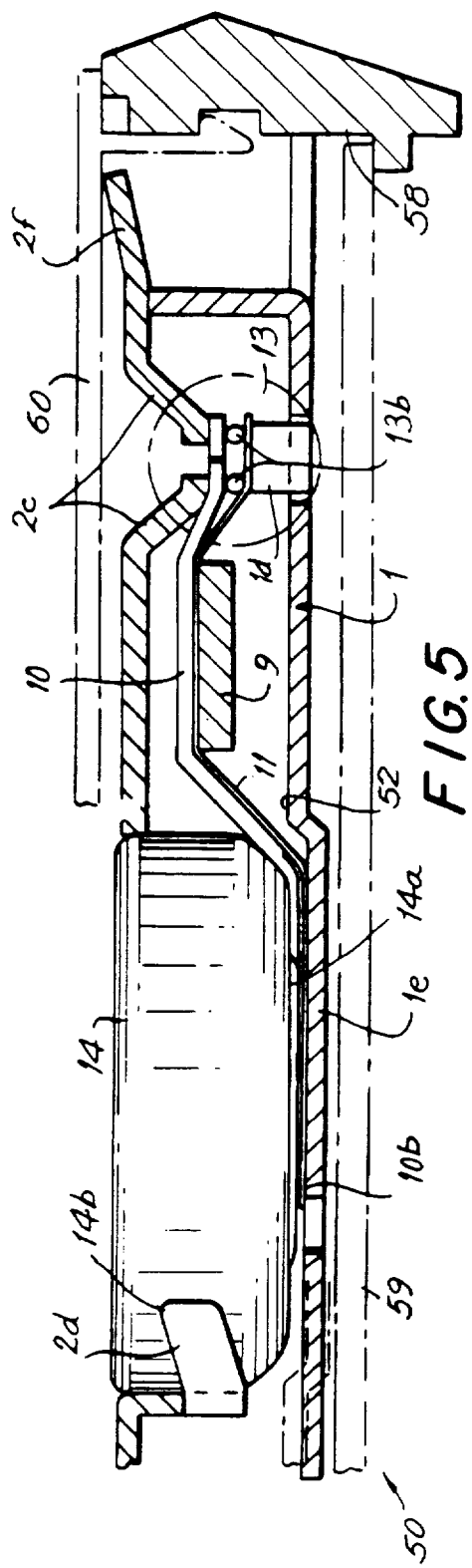

Referring once again to FIG. 1, main plate 1 is made from a thin plate of ribbon-shaped material. A plurality of main plates 1 are formed on (e.g. stamped out of) ribbon-shaped material and connected to the unused portions of the ribbon-shaped material by tie bars 1j. As shown in FIG. 5, gear train bridge 2 includes a plurality of springs 2f which resiliently contact a back cover 60 of timepiece 50. Main plate 1 is prevented from moving in the direction of dial face 59 by projections 1i. Advantageously, no intermediate frame is required by timepiece 50 in contrast to conventional timepieces.

As shown in FIG. 2, main plate 1 also includes a plurality of integrally connected L-shaped portions 1k having stems which extend towards gear train bridge 2 and legs which are substantially parallel to gear train bridge 2. A protrustion 1l on each leg 1k is in contact with gear train bridge 2. The distance separating main plate 1 from gear train bridge 2 is therefore equal to the combined heights of L-shaped portion 1k and protrusion 1l are formed by drawing or half-blanking. Generally, L-shaped portions 1k and, in particular their height, vary significantly (i.e. variation in tolerance is high). Consequently, L-shaped portions 1k can not be used by themselves to provide an acceptable predetermined distance separating main plate 1 from gear train bridge 2. By using protrusion 1l, which can be made to vary in height, variation in height of L-shaped portions 1k can be compensated for. Main plate 1 is connected to gear train bridge 2 through an interference fit between a concave circumferential portion 1s of main plate 1 and a corresponding convex portion 2k of gear train bridge 2.

The circumference of main plate 1 is bent or stretched (i.e. drawn) except for tie bars 1j to prevent distortion and improve the rigidity of main plate 1. A plurality of band like drawn portions 1m are formed by drawing or half-blanking near the regions of the circumference of main plate 1 not otherwise bent or drawn. Additionally, a plurality of bead like portions 2j are formed in gear train bridge 2, particularly near pivot holes for the wheels of the gear train. Bead like portions 2j improve the rigidity and prevent the distortion of main plate 1. A bead 1n in is formed near the circumference of plate 1 through drawing or half-blanking. A pair springs 2q and 2r press against magnetic coil and coil lead substrate 10 to further hold the same in place respectively.

Timepiece 50 operates as follows. An alternating magnetic field across stator 7 causes rotor 8 to rotate. The alternating magnetic field is created by providing an alternating current to the coils of stator 7 from IC chip 12. The frequency of the alternating current is controlled by the oscillating signal produced by crystal oscillating unit 13. Rotation of rotor 8 causes fifth wheel and pinion 6 to rotate which in turn rotates fourth wheel and pinion 4. Since teeth 5a of the third wheel and pinion 5 mesh with pinion 4b of fourth wheel and pinion 4, third wheel and pinion 5 rotates through the meshing of teeth 3c of center wheel and pinion 3 with pinion 5b, center wheel and pinion 3 also rotates. Wheels and pinions 3 and 4 rotate independently of each other due to the loose fitting of shaft 4f within shaft 3h (not shown). The hands of timepiece 50 are connected to distal end 3g of pinion 3b and distal end 4g of shaft 4f above a dial face 59. By moving winding stem 15 outwardly from casing 58 so that pinion 15b meshes with teeth 15c of minute wheel 16, the position of hands can be adjusted as desired.

Figure 6:
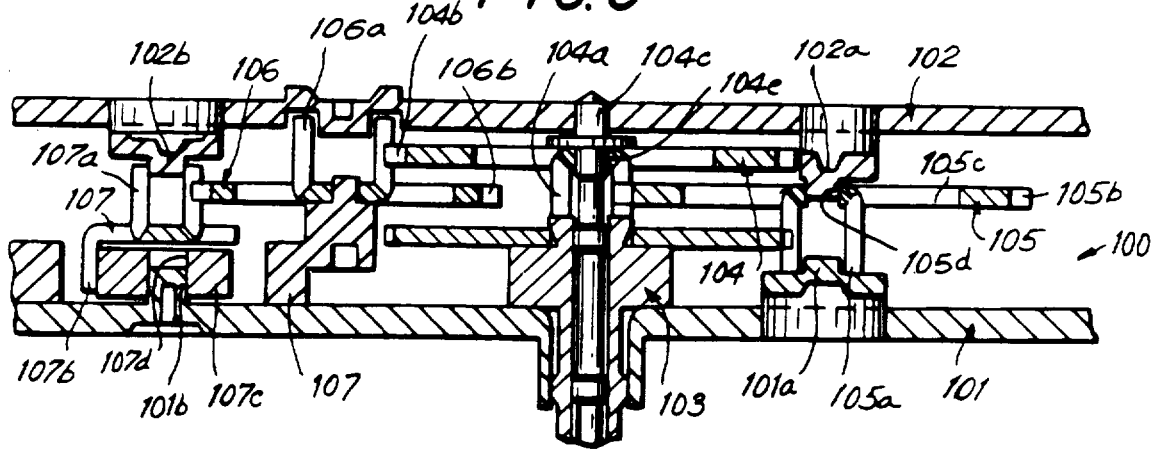
FIG. 6 is a fragmented developed cross-sectional view of a timepiece in accordance with an alternative embodiment of the invention.

Reference is now made of FIG. 6 wherein another embodiment of a gear train, generally indicated as 100, constructed in accordance with the invention is depicted. A main plate 101 supports a gear train bridge 102. A center wheel and pinion, generally indicated as 103, a fourth wheel and pinion, generally indicated as 104, a third wheel and pinion, generally indicated as 105, a fifth wheel and pinion, generally indicated as 106 and a rotor 107 are supported between main plate 101 and gear train bridge 102.

Third wheel and pinion 105 includes a pinion 105a which is formed by forming a pivot hole 105d by shearing and then bending the excess to form a pinion 105a (i.e. wheel and pinion assembly 105 is zero-cut then bent). The gear teeth 105b of pinion 105a are formed by press blanking to form the teeth profiles near the circumference of gear wheel 105e. A burr 105d of pinion 105a extends circumferentially about pinion 105a. A protrusion 101a which is drawn from main plate 101 is formed by half-blanking or plastic working. Protrusion 101a acts as a lower pivot by supporting the sheared and bent portion defining pinion 105a. A protrusion 102a which is processed in the same manner as main plate 101 acts as an upper pivot 102a by extending through pivot core 105e.

Fourth wheel and pinion assembly 104 is formed with a shaft 104c a pinion 104a and gear 104b. Shaft 104c is interference fit into pinion 104a. Gear teeth 104b are processed in the same manner as third wheel and pinion 105. Pinion 104a meshes with third gear 105b. A burr 104e extends centrally about pinion 104a to prevent influencing the meshing of pinion 104a and third gear 105b.

Fifth wheel and pinion assembly 106 includes a pinion 106a and gear teeth 106b. Pinion 106a meshes with teeth 104b of fourth wheel and pinion 104. Fifth wheel and pinion 106 is processed in the same manner as third wheel and pinion assembly 105.

A rotor 107 includes a pinion 107a and a plurality of magnet fixing portions 107b. Rotor 107 is unitarily formed with a magnet 107c. A hole 107d formed in magnet 107c is supported upon a dowel 101b of main plate 101 to form a lower pivot for rotor 107. A dowel 102b of gear train bridge 102 extends within pinion 107a to form an upper pivot for rotor 107. The number of teeth of each pinion is preferably less than eight to meet manufacturing requirements. Additionally, the thickness of the material due to the press work performed should be less than or equal to 0.2 mm.

Figure 8:
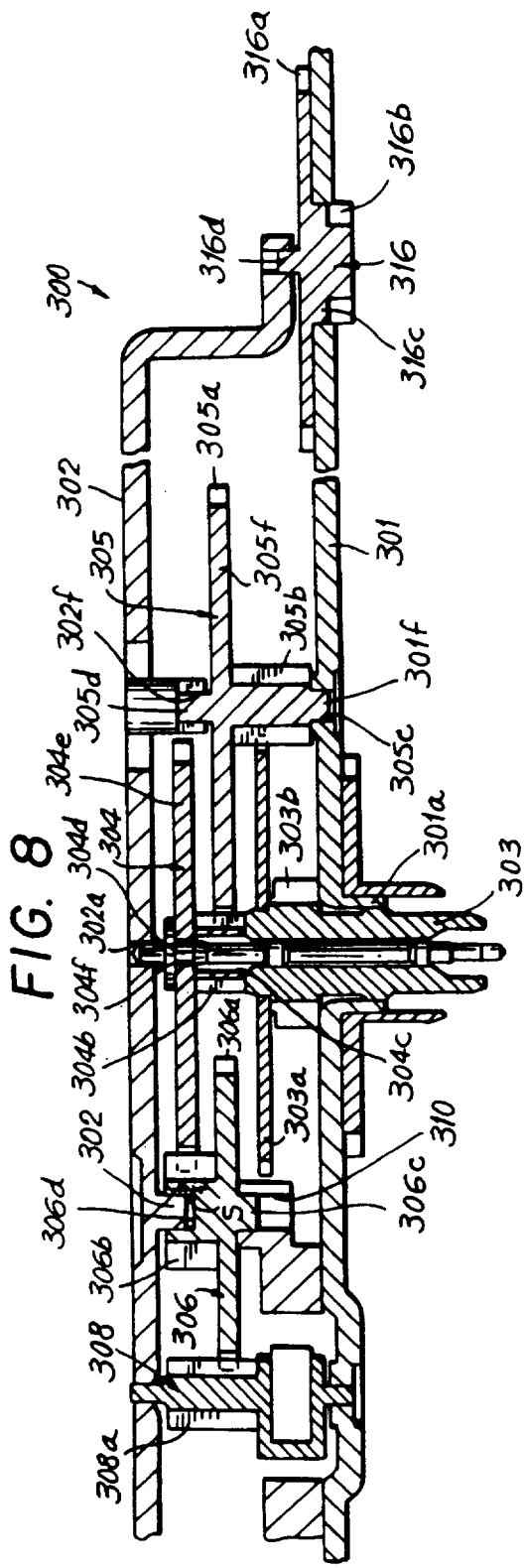
FIG. 8 is a fragmented developed cross-sectional view of another alternative embodiment of the invention.

Reference is now made FIG. 8 wherein another embodiment of the timepiece, generally indicated as 300, constructed in accordance with the invention is provided. A gear train bridge 302 is supported by a main plate 301. A center wheel and pinion assembly generally indicated as 303 includes a center gear 303a and center pinion 303b. Center gear 303a is interference fit about center pinion 303b with a predetermined sliding torque between center gear 303a and center pinion 303b.

A fourth wheel and pinion assembly generally indicated as 304 includes a fourth gear wheel 304e having gear teeth 304a about the circumference, a fourth pinion 304b and a concave portion 304c integrally formed as a single unit by forging or compressing a metal material. An opening 304f is formed in wheel 304c by shearing and a shaft 304d extends from within opening 304f.

Center wheel and pinion assembly 303 is rotatably supported by a bushing 301a of main plate 301 as a lower pivot and two bending portions of the shaft 304d of fourth wheel and pinion assembly 304. Fourth wheel pinion assembly 304 is supported within central wheel and pinion 303 which in turn is supported within bushing 301a of main plate 301. Fourth wheel and pinion assembly 304 is also supported within a pivot hole 302a of gear train bridge 302 which acts an upper pivot.

The play of the center wheel and pinion assembly 303 and fourth wheel and pinion assembly 304 is determined by the configuration of main plate 301 and gear train bridge 302.

A third wheel and pinion 305 includes a third pinion 305b which engages center gear 303a. Third wheel and pinion assembly 305 further includes a third wheel 305i having gear teeth 305a about the circumference for engaging with fourth pinion 304b. A lower pivot 305c is integrally formed with third pinion 305b and center gear 303a. Lower pivot 305c is rotatably supported within a hole 301f of main plate 301 and upper pivot 305d is rotatably supported within hole 302f of gear train bridge 302.

A rotor 308 is rotatably supported between main plate 301 and gear train bridge 302. A fifth wheel and pinion, generally indicated as 306, includes a fifth gear 306a, fifth pinion 306b, lower pivot 306c and concave portion 306d formed as a single unit. Fifth gear 306a engages a pinion 308a of rotor 308 while fifth pinion 306b engages fourth gear 304a.

Lower pivot 306c is rotatably mounted within a hole 310 while upper pivot 306d is rotatably supported on dowel 302b of gear train bridge 302.

Third wheel and pinion assembly 305, fourth wheel and pinion assembly 304 and fifth wheel and pinion assembly 306 are formed by forging and compressing. However, the tooth profiles of respective gear teeth 304a, 305a and 306a are formed by press blanking. The central hole 304f of fourth wheel 304e is formed by press blanking so the diameter of hole 304f is smaller than the diameter of concave portion 304c which is formed by forging. The pivot portion of respective wheel and pinions 304, 305 and 306 are provided with finished surfaces which prevent rupturing of the surface which might arise from the press blanking process necessary to provide a smooth surface thereby providing a timepiece wheel having lower torque loss.

Figure 9:
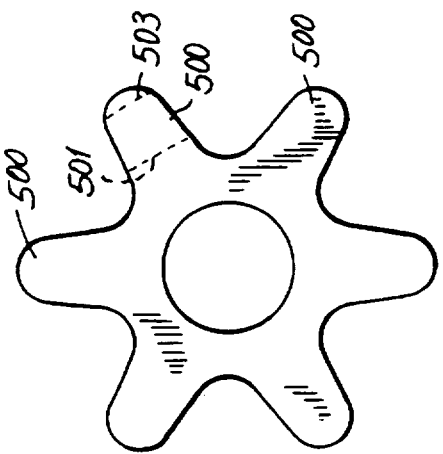
FIG. 9 is a top plan view of a pinion constructed in accordance with the invention.

Reference is now made to FIG. 9 in which a pinion tooth profile representative of each of the wheels shown in FIGS. 2–8 of the present invention is provided. It is desirable that each tooth 500 is not formed independently to facilitate the forging or compressing processes. The thickness of each base 501 of each tooth 500 is greater than or equal to the thickness of the edge portion 503 of each tooth 500 to facilitate material flow during processing.

Figure 10:
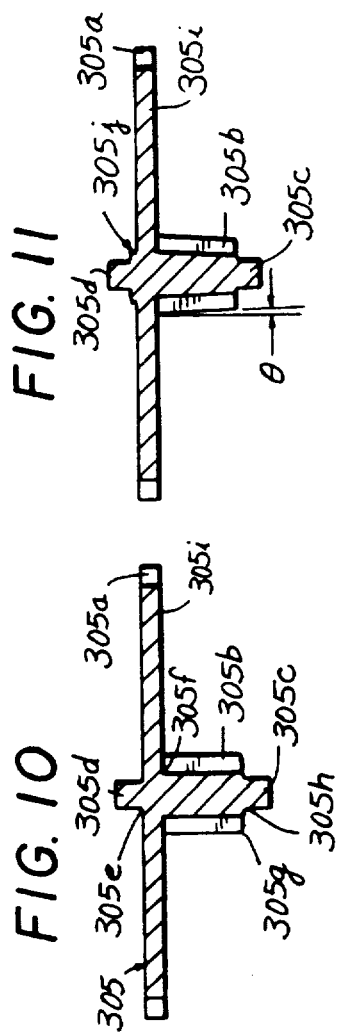
FIG. 10 is a cross-sectional view of a timepiece wheel and pinion assembly in accordance with another embodiment of the invention.

Reference is now made FIG. 10 wherein a sectional view of third wheel and pinion assembly 305 is provided. In the production of third wheel and pinion 305, it is preferable that a connecting portion 305f between a base portion of wheel 305i and pinion 305b be rounded. Additionally, sufficiently round portion 305e is located at the connection between upper pivot 305d and the base of wheel 305i. A third rounded portion 305h is located between lower pivot 305c and pinion 305b. Rounded portions 305e, 305f, 305g and 305h are added to the teeth portion of pinion 305b to facilitate material flow during production. This construction is applicable to each of the other embodiments.

Figure 11:
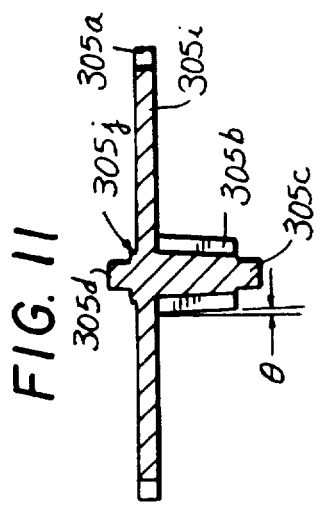
FIG. 11 is a cross-sectional view of a pinion and wheel assembly in accordance with another embodiment of the invention.

Reference is now made to FIG. 11 wherein a sectional view showing another structure for a timepiece wheel utilized in FIGS. 2–8 is provided. Third wheel and pinion assembly 305 is used by way of example. Like parts are identified by like numerals. Third wheel and pinion 305 includes a third gear 305a, third pinion 305b, lower pivot 305c and upper pivot 305d. Third pinion 305b includes a draft angle θ. This draft angle θ is provided so that the parts may be removed more easily when the pieces are taken from the after they have been forged and compressed. In an exemplary embodiment, θ is an angle between 0.1° and 3°. In particular, when the pinion height of third pinion 305b is greater than or equal to 0.4 mm, the production quality of wheel and pinion assembly 305 may be stabilized by providing a draft angle θ. Additionally, a shoulder portion 305j is provided to reduce the contact resistance between gear train frame 302 and gear wheel 305i. A shoulder may also be provided at the side of lower pivot 305c.

Reference is again made to FIG. 2. Concave portion 5e of third wheel and pinion assembly 5 and concave portion 6c of fifth wheel and pinion assembly 6 facilitate the projecting of respective pivots 5d and 6d during forging or compressing. It is desirable that the depth of concave portions 5e and 6c be greater than the thickness T of respective collars 5c and 6b.

As can be seen in FIG. 8, upper pivot 306d of fifth wheel and pinion assembly 306 also functions to allow lower pivot 306c to project during forging or compressing while facilitating the pushing out of material to form the edge of the pinion teeth. Additionally, the depth s of upper pivot 306d is preferably less than the height of fifth pinion 306b. The construction prevents damage to the die during forging/compressing thereby speeding the mass production process. Additionally, the volume of upper pivot 306d should be smaller than the volume of lower pivot 306c making it possible to obtain the above qualities.

A minute wheel and pinion 316 supported on frame 301 includes a minute gear wheel 316d having gear teeth 316a about the circumference, minute pinion 316b, lower pivot 316c and upper pivot 316d, all integrally formed of a metal material. Lower pivot 316c is disposed between gear 316a and pinion 316b. Minute pinion 316b engages an hour wheel (not shown) while minute gear 316a engages the center pinion. The height of minute pinion 316b is equal to about one half of the length from the surface of minute gear 316a to the top of pinion 316b. Lower pivot 316c can thus be formed as a circle and in particular, it becomes easier to forge or compress pivot 316c if the length of pinion 316b is very long.

Figure 12:
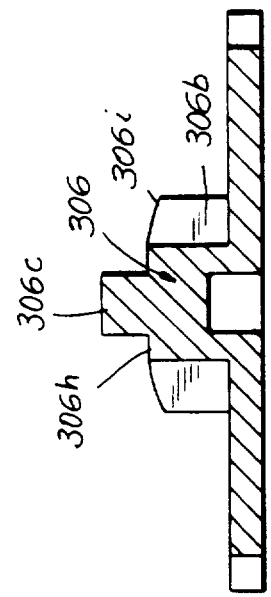
FIG. 12 is cross-sectional view of the pinion and wheel assembly in accordance with another embodiment of the invention.

Reference is now made to FIG. 12 wherein a sectional view of fifth wheel and pinion 306 is depicted. Fifth wheel and pinion assembly 306 includes a flat portion 306h which acts as a shoulder surface. Flat portion 306h extends into a circular arc surface 306i which slopes away from pivot 306c and acts to reduce the contact resistance between fifth wheel and pinion 306, main plate 301 and the frame during rotation of pinion 306b. It is possible to combine the above-mentioned embodiments thereby improving the quality of manufacture.

Figure 13A:
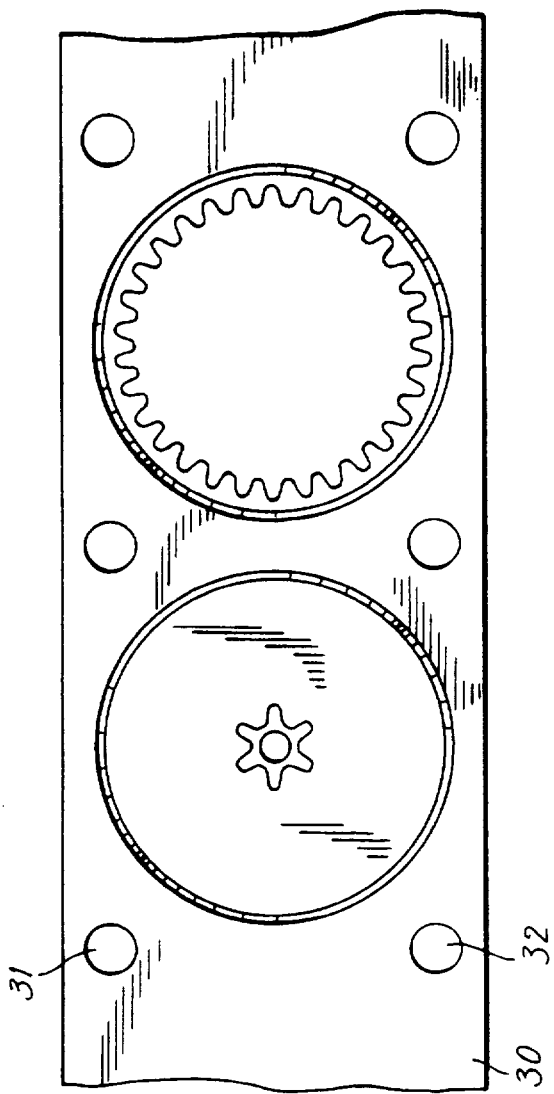
FIG. 13a is a top plan view of the processing of the timepiece wheel in accordance with the invention.
Figure 13B:
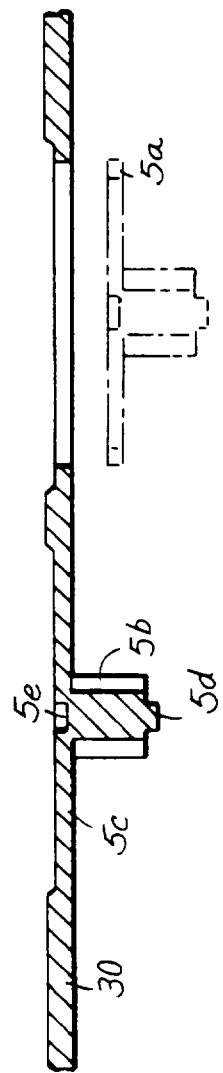
FIG. 13b is sectional view showing the processing of the timepiece wheel in accordance with the invention.

Reference is now made FIG. 13a and 13b in which the process for forming a timepiece wheel and pinion through plastic working is depicted. Third wheel and pinion 5 is used by way of example. The die to form wheel and pinion 5 is described in greater detail below in conjunction with FIG. 16.

First, a material strip 30 is inserted into a die. Pilot holes 31 and 32 are opened and are used as references for positioning strip member 30. Next, a compressive load is applied to one portion of strip member 30 having an area greater than that of gear 5 from both front and back surfaces. This results in the thinning of strip member 30 and the formation of wheel 5c of gear 5. Additionally, the majority of the deformed material of the thin portion of strip 30 projects downward to form pinion 5b and lower pivot 5d providing the desirable tooth profile and a lower pivot. This process is known as forging or compressing. Furthermore, concave portion 5e is formed to become the upper pivot and to facilitate the making of the projection defining lower pivot 5d. The finishing surface of the die may be made smooth to produce a smooth surface for concave portion 5e, lower pivot 5d and pinion 5e making it possible to form a timepiece wheel having small torque losses at the pivot portion and gear portion.

Gear 5a is then sheared from strip 30 completing formation of the third wheel and pinion 5. Gear 5a may be removed from the strip by rolling. With the exception of the fourth wheel and pinion assembly, the above process is used for each of the embodiments.

Figure 14:
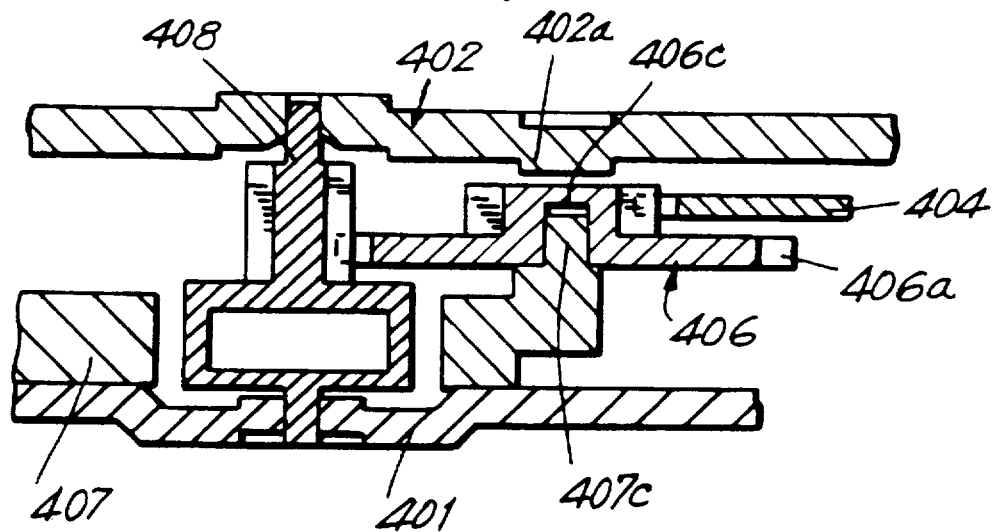
FIG. 14 is a fragmented developed cross-sectional view of another embodiment of a timepiece in accordance with the invention.

Reference is now made to FIG. 14 in which a sectional view of another embodiment of a gear train bridge, generally indicated as 402, is depicted. A stator 407 has a projection 407c. A fifth wheel and pinion assembly 406 manufactured in accordance with the above described method, includes a concave portion 406c supported on protrusion 407c to act as a lower pivot. Fifth wheel and pinion assembly 406 does not include an upper pivot. The play of fifth wheel and pinion assembly 406 is determined by a projection 402a of gear train bridge 402 and stator 407. Stator 407 and axis portion 407c are used by way of example to support fifth wheel and pinion assembly 406, however, other members such as main plate 401 and the like may be used as a support. Additionally, concave portion 406c may be replaced by a hole. A fourth wheel 404 engages with fifth wheel and pinion 406 so that the length of protrusion 407c must be set to have a length high enough to allow wheel 404 to engage with fifth wheel and pinion 406.

Figure 15:
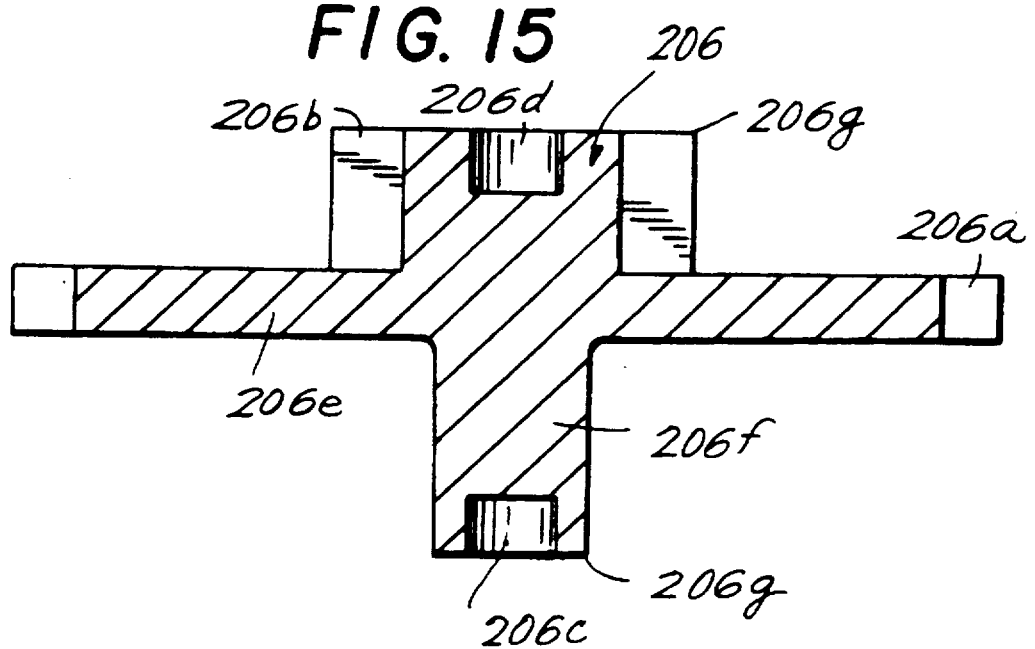
FIG. 15 is a cross-sectional view of a fifth wheel and pinion in accordance with an embodiment of the present invention.

Reference is now made to FIG. 15 wherein a sectional view of a fifth wheel and pinion, generally indicated as 206 constructed in accordance with another embodiment of the invention is provided. Fifth wheel and pinion 206 includes a shaft 206f having a gear wheel 206e extending therefrom and gear teeth 206a for engaging with a rotor extending about the circumference of wheel 206e. A fifth pinion 206b is supported above wheel 206e. A bearing 206d is formed at the top of axis 206f and is supported by a gear train bridge. Lower bearing 206c is supported on a dowel of a main plate. All components with the exception of gear teeth 206a are located within the circumference of wheel 206e. A burr 206g is formed on the upper surface of pinion 206b and lower surface of shaft 206f. Burr 206g need not always be formed but is sometimes produced in accordance with processing requirements or die manufacturing.

Figure 16A:
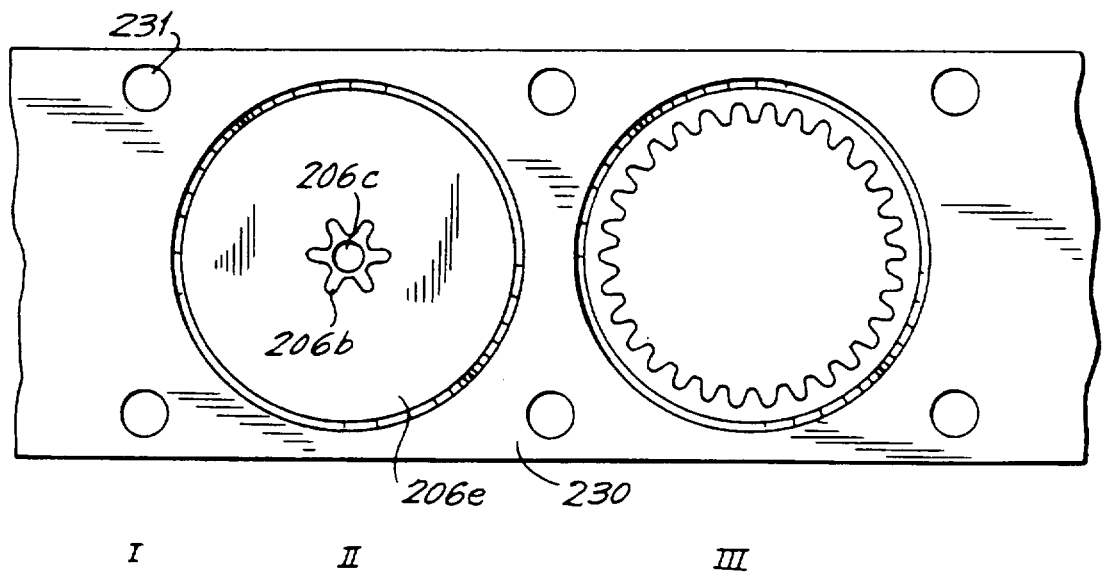
FIG. 16a is a top plan view of the manufacture of the fifth wheel and pinion of FIG. 15 in accordance with the invention.
Figure 16B:
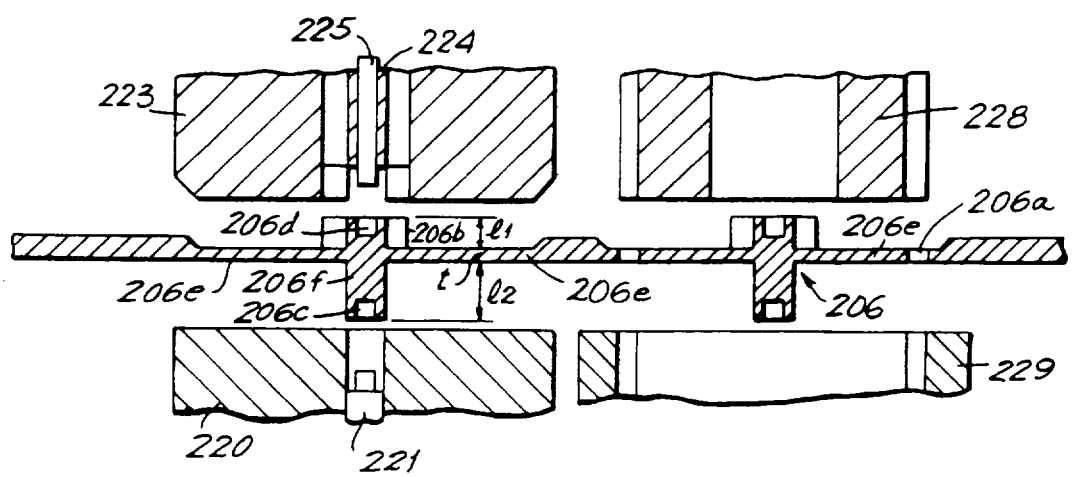
FIG. 16b is sectional view of the manufacture of the fifth wheel and pinion of FIG. 15 in accordance with the invention.

Reference is now made to. FIGS. 16a and 16b wherein the formation of fifth wheel and pinion assembly 206 is depicted. First, a strip member 230 is inserted into a die. Pilot holes 231 and 232 are opened and used as reference holes for positioning film 230. Next, a compressive load is applied to both the front and back surfaces at one portion of strip portion 230 having an area larger than that of teeth 206a. Strip member 230 is thus thinned by the compressing load forming a wheel portion 206e. The greater part of material of the thin portion projects downward thereby forming fifth pinion 206b, shaft 206f and bearings 206c and 206d resulting in a desired wheel and pinion shape with the exception of the teeth profiles of fifth gear 206a. Again, this process is referred to as forging and compressing. Bearing portion 206d facilitates the projecting of upper surface of fifth pinion 206b, the portion of the upper surface of pinion 206b being otherwise very hard to fill in the die. Additionally, the finishing surface of the die may be made smooth so that the surface of fifth pinion 206b and bearing portions 206c and 206d may be formed having a smooth surface providing a timepiece wheel and pinion having small torque loss in the support portions and engaging portions. Next, fifth gear 206a is sheared from strip member 230 to form fifth wheel and pinion 206.

Fifth wheel and pinion 206 may be made of iron, copper alloy, aluminum or super plastic such as super plastic aluminum (Cu 77.5, Al-10, Fe 4.5, Ni-6, Mn-2), super plastic titanium alloy, super plastic stainless alloy and the like. When fifth wheel and pinion 206 is processed by upsetting, materials such as copper alloy and aluminum may be used and super plastic alloys are even more preferable. As is seen in FIG. 16(b) to perform forging or compressing, an ejector 221 is inserted through a lower die 220 to form bearing 206c as a blind hole to be supported on a shaft of the main plate. The teeth profile for pinion 206b formed on an upper die 223 is formed by an electric discharge machine, cutting or the like. An ejector 224 having a similar configuration as ejector 221 is inserted into gear 206. A pin 225 is affixed to ejector 224. Pin 225 is carried by ejector 224 to form bearing 206d as a blind hole which is adapted to be supported by a shaft of the gear train bridge. Ejectors 221 and 224 eject articles from respective dies 223 and 220 which remain in upper die 223 or lower die 220 after forging or compressing has been accomplished.

Gear wheel 206e will be destroyed or transformed if wheel 206e is pushed by too great of an ejecting force, therefore it is necessary to assure that ejection is accomplished within the outer diameter of pinon 206b which has greater strength. Additionally, a slight gap is provided between ejector 221 and lower die 220 and between ejector 224 and upper die 223 to allow material to more easily fill the die during forging or compressing when the sum of the pinion height $l_1$ and the shaft height $l_2$ is two and one half times the thickness T of wheel 206e. In particular, during forging or compressing, the gap acts as an escape opening for air or oil which exist in the space during forming of fifth pinion 206b and axis 206f. Because very large forces are applied during forging or compressing, in an exemplary embodiment, a cemented carbide is used to construct the dies. During shearing, a drift 228 which forms the tooth profile of fifth gear teeth 206a is moved downward to shear the tooth profile of fifth gear teeth 206a thereby completing the formation of fifth wheel and pinion 206.

Figure 17A:
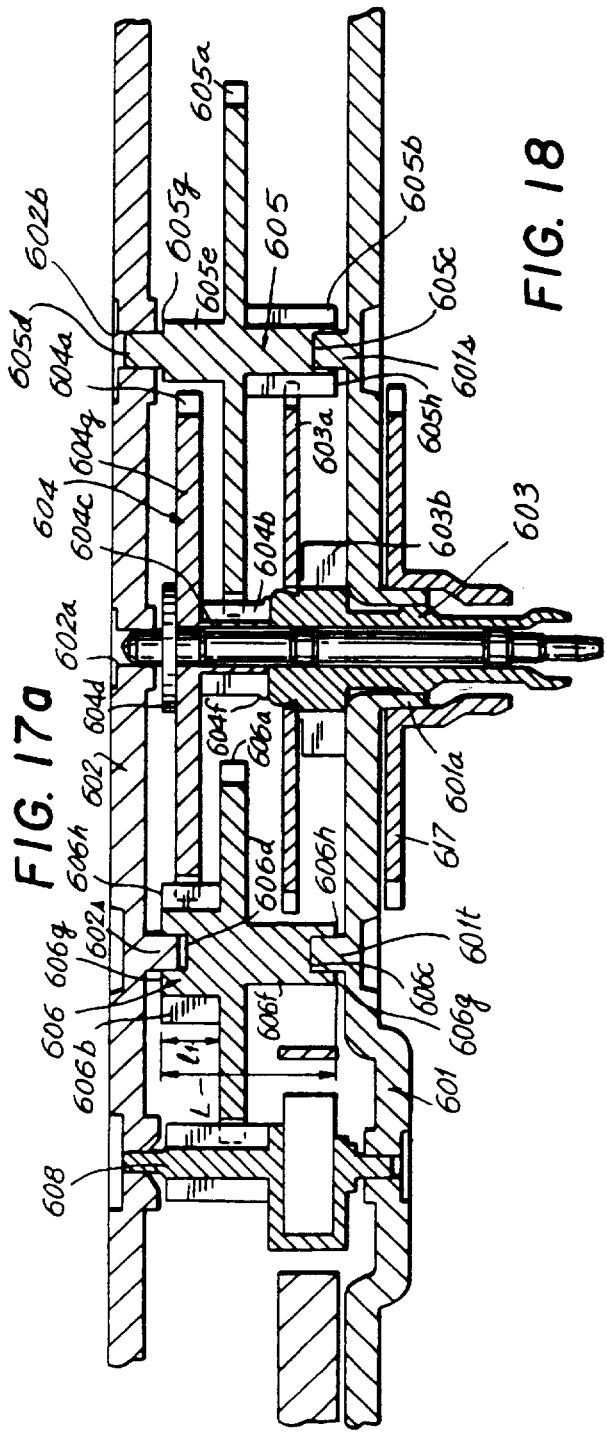
FIG. 17a is a fragmented developed cross-sectional view of another embodiment of a timepiece in accordance with the invention.
Figure 17B:
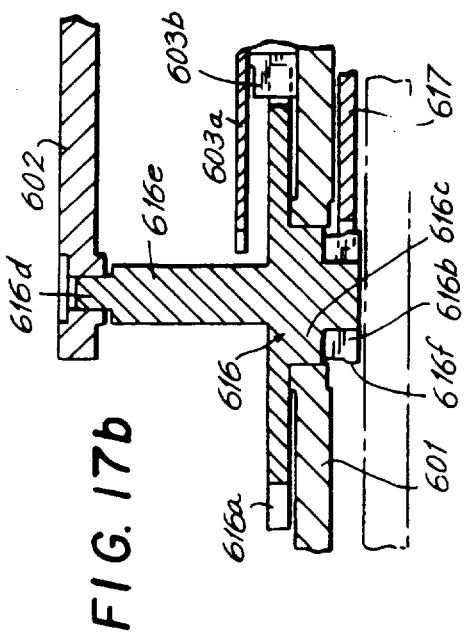
FIG. 17b is a cross-sectional view of another embodiment of the timepiece wheel and pinion assembly in accordance with the invention.

Reference is now made to FIGS. 17a and 17b in which a cross-sectional view of another embodiment of timepiece wheels constructed in accordance with the invention is provided. A gear train bridge 602 is supported by a main plate 601. A central wheel and pinion generally indicated as 603 includes a center gear wheel 603a and center pinion 603b. Center gear 603a is interference fit upon center pinion 603b with a predetermined slide toque between center gear 603a and center pinion 603b. A fourth wheel and pinion, generally indicated as 604 includes a fourth gear wheel 604g having gear teeth 604a about its circumference. A fourth pinion 604b is integrally formed with gear 604g of a metal material and includes a concave portion 604c formed therein. Fourth wheel and pinion 604 acts as a fourth wheel and is formed by press shearing to cut a center hole and teeth profile of fourth gear teeth 604a. A fourth shaft 604d is affixed to the center hole which is extension of concave portion 204c. Center wheel and pinion 603 is rotatably supported by a bushing 601a of main plate 601 at its bottom and two projections 604f at its top. Fourth wheel and pinion assembly 604 is therefor supported by bushing 601a through central wheel and pinion 603 at its bottom and by a pivot hole 602a of gear train bridge 602 at its top. The play between center wheel and pinion 603 and fourth wheel and pinion 604 is determined by main plate 601 and gear train bridge 602.

A third wheel and pinion, generally indicated as 605, includes a third pinion 602b, third gear teeth 605a, a shaft portion 605e, a bearing portion 605c and an upper pivot 605d all integrally formed as a single metal unit. Third pinion 605b engages with center gear 603a while third gear teeth 605a engages with fourth pinion 604b. Third wheel and pinion assembly 605 has a bearing portion 605c which is rotatably supported upon a dowel 601s of main plate 601 to act as a lower pivot. An upper pivot 605d is rotatably supported within a hole 602b of gear train bridge 602. The play of third wheel and pinion 605 is determined by the bottom surface of bearing portion 605c, the upper surface of dowel 601s, the surface of a shoulder portion 605g of third wheel and pinion 605 and gear train bridge 202. The lower surface of third pinion 605b includes a burr 605h, however an appropriate gap is provided so that burr 605h does not contact with the upper surface of main plate 601.

A rotor 608 is supported between main plate 201 and gear train bridge 602. A fifth wheel and pinion, generally indicated as 606, includes a fifth gear wheel 606g having gear teeth 606a about the circumference, a fifth pinion 606b, a first bearing portion 606d and a shaft 606f integrally formed as a single unit. Fifth gear 606a engages with the pinions of rotor 608, while fifth pinion 606 engages with fourth gear teeth 604a. Bearing portion 606c is rotatably supported about a dowel 601t of main plate 601 to act as a lower pivot. Bearing portion 606d is rotatably supported about a dowel 602s of gear train bridge 602 to act as an upper pivot. The play of fifth wheel and pinion 606 is determined by the bottom surface of bearing portion 606c, the upper surface of dowel 601t, the bottom surface of bearing portion 606d and the lower surface of dowel 602s. A burr 606h is formed at the upper surface of fifth pinion 606b and lower surface of shaft 606f. A predetermined gap is provided so that burrs 606h do not contact with either gear train bridge 602 or main plate 601. A distance L between respective bearing surfaces 606g of fifth pinion and wheel assembly 606 has a distance twice as large as the height $l_1$ of pinion 606b so that it is possible to provide a small wheel inclination.

A minute wheel, generally indicated as 616, includes a minute gear 616a, a minute pinion 616b, a lower pivot 616c, an upper pivot 616d and shaft portion 616a. Minute wheel 616 is manufactured in the same manner as fifth wheel and pinion 606. An hour wheel 617 is rotatably mounted on main plate 601. Minute gear 616a engages center pinion 603a while minute pinion 616b engages hour wheel 617.

Minute wheel 616 is manufactured by the same method as fifth wheel and pinion 606. However, the body of timepiece 50 becomes thicker because minute pinion 616b has a burr portion. It becomes difficult to form a predetermined burr in the above processing method. Accordingly, a process for destroying the burr during the steps of forging or compressing and shearing is provided. A destroyed burr 616f forms gearing having a larger outside diameter than the teeth profile at the circumference of the pinion teeth. Therefore, a backlash and clearance are set to an appropriate value to allow destroyed burr portion 616f to engage hour wheel 617.

Additionally, projections 604f formed by a burr of pinion 604b may be treated in a manner similar to that of minute pinion 616b to engage burr portion 604f by third gear 605a to control drift of the second hand, the burr is provided on a sectional surface. Additionally, the pinion shape is formed so that fourth wheel and pinion assembly 604 may be assembled.

Figure 18:
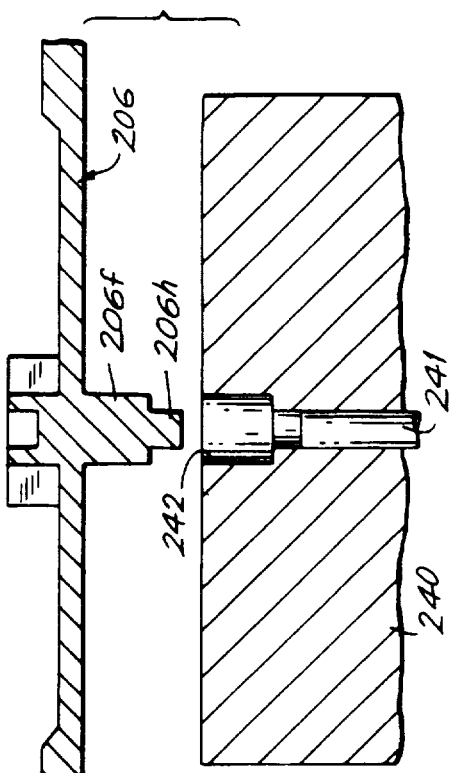
FIG. 18 is cross-sectional view of the pinion and wheel assembly and die in accordance with another embodiment of the instant invention.

Reference is now made to FIG. 18 in which a sectional view of the formation of a timepiece wheel in accordance with another embodiment of the invention is provided. The upper die is the same as upper die 223 and therefore is not depicted. A lower die, has a through hole 242 formed as a cylindrical portion formed by discharge processing. An ejector 241 is inserted in through hole 242. The cylindrical portion forms shaft 206f of wheel and pinion 206 and ejector 241 forms lower pivot 206h at the bottom surface of shaft portion 206f. A burr which usually occurs between ejector 241 and through hole 242 during forging or compressing is prevented through the controlling of the air volume (pivot height) when forming the pivot.

The ejector as described in connection with FIGS. 16 and 17 may be provided on either the upper or the lower die. Additionally, pin 225 may be moved up when forming the upper pivot as shown in connection with the lower pivot of FIG. 18. In the above forging or compressing example the strip members are used by way of explanation. However, a blank which is a bar member cut to predetermined lengths may also be processed by upsetting. Therefore, by forming the teeth profiles of the gear, a savings in cost may be realized.

One example having a gear as the timepiece wheel and a pinion has been utilized above, however, the examples above may also be applied to a pinion and gear without a wheel. For example, the pinion gear is formed by shearing a material at a diameter slightly larger than the outer diameter of the pinion or is processed by upsetting. Additionally, the fifth wheel and pinion is used by way of explanation in the above embodiments, however each of the described methods may be applied to the other timepiece wheels.

By providing a bearing portion and pinion portion formed by forging or compressing, timepiece wheels having smooth surfaces for the bearing portion and the pinion portion are provided thereby reducing torque loss at the bearing portion. Additionally, it becomes possible to utilize the timepiece wheel and pinion assembly having a low torque as the front gear in a gear train. Additionally, in view of the die structure, the length of the supporting portion is provided with a sufficient length providing gear overlap which results in thinner timepieces.

A timepiece wheel and pinion for use in deceleration or acceleration gear trains is formed of an integral piece of metal material having a desirable strength and processing time. As a result the processing time may be reduced to as low as one-half second by achieving all the processing by plastic working. Additionally, by providing a pinion tooth profile having a tapered configuration at one portion and a round configuration used for the connecting portion of pinion and the wheel and the connecting portion of the pivot and gear, the flowing of material during the forging and compressing processes are facilitated. Additionally, such structure increases the height of the pinion. By providing a draft on the plane and complex pinion portion the quality and detachability of the timepiece wheel and pinion assembly is improved.

It will thus be seen that the objects set forth above, among those made apparent from the preceding description, are efficiently attained and some certain changes may be made in carrying out the above process and in the article set forth without departing from the spirit and scope of the invention. It is intended that all matter contained in the above description and shown in the accompanying drawings shall be interpreted as illustrative and not in the limiting sense.

It is also to be understood that the following claims are intended to cover all of the generic and specific features of the invention herein described and all statements of the scope of the invention which, as a matter of language, might be said to fall therebetween.

What is claimed is:

1. A method for forming a timepiece wheel having a gear wheel with gear teeth formed about the circumference thereof, the gear wheel being integrally formed with a pinion comprising the steps of;

inserting a strip of material into a die;

applying a compressive load to one portion of the strip member at both the front and back surfaces, the compressive load being applied to a portion having an area greater than that of the gear wheel to form a thinned portion;

pushing a portion of the material of the thinned portion centrally to form a pinion portion and bearing portion projecting from the plane of the thinned portion of the strip; and shearing the thin portion from the strip of material.

2. The method of claim 1, and including the further steps of shearing the thinned portion to define a plurality of teeth portions each having a base coupled to the remainder of the thinned portion, bending each of the plurality of teeth portions in a region adjoining the base so as to project from the place of the thinned portion and bending a portion of the teeth portion between said base and the end of each of the plurality of teeth portions so that the end of the teeth portion extends essentially parallel to and spaced from the place of said thinned portion.

3. The method of claim 1, wherein the pinion is formed with a taper for ease of removal from the die.

4. A method for forming a wheel and pinion for a timepiece integrally formed as a unitary structure having a shaft portion, a gear wheel extending therefrom, gear teeth formed about the circumference of the gear wheel and a pinion supported about the shaft portion, a concave bearing surface being formed at the top of the shaft portion and a concave bearing surface being formed at the bottom of the shaft comprising the steps of:

inserting a strip of material into a die;

applying a compressive load to both the front and back surfaces of the strip at a portion of the strip having an area larger than that of the diameter of a circle formed by the gear teeth to form a thin material portion;

forming a shaft and pinion from the greater part of material formerly contained within the thin portion during the application of the compressive load;

forming a first concave portion at one end of the shaft;

forming a second concave portion at an opposed end of the shaft.

5. The process of claim 4, further including the step of shearing the thin material area from the strip of material.

6. The method of claim 5 further comprising the step of forming the profile of teeth for the pinion.

7. The method of claim 5, wherein the concave compressive load is by a die, the bearing surfaces being formed by ejecting a pin through an ejector mounted within the die.

8. The method of claim 4, further including the step of removing the thin layer from the strip member by rolling.

9. The method of claim 4, further comprising the step of forming each individual tooth on the gear wheel by shearing.

10. A method for producing a timepiece wheel having a gear wheel integrally formed with a pinion, a shaft extending from the gear wheel having a distal end which ends in a projecting pivot, comprising the steps of:

placing a strip of material within a die, the lower die being formed with a cylindrical portion forming the projecting pivot and having an ejector pin at the end of the projecting pivot;

providing a compressive load at both the front and back of the strip of material to form a thinned region;

forcing the material from the thinned region within the die to form the projecting pivot;

ejecting the material from the die at least using the ejector pin;

controlling the position of the ejector pin during the application of the compressive force to reduce the production of a burr; and shearing the compressed section from the strip of material.

11. The method of claim 10, wherein the position of the ejector pin is controlled by controlling air volume.

* * * * *